United States Patent

[11] 3,582,191

[72] Inventors David N. Cohen
376 A School St.;
Brent W. Lambert, 32 Lloyd Road, both of
Watertown, Mass. 02172
[21] Appl. No. 824,603
[22] Filed May 14, 1969
[45] Patented June 1, 1971

[54] THREE-DIMENSIONAL INDIRECT OPHTHALMOSCOPE
6 Claims, 7 Drawing Figs.
[52] U.S. Cl.................................................. 351/16, 350/298, 351/6
[51] Int. Cl..................................................... A61b 3/12, G02b 7/18
[50] Field of Search........................................ 351/1, 6, 13, 14, 16; 350/145, 146, 72, 298

[56] References Cited
UNITED STATES PATENTS
1,648,013 11/1927 Copeland...................... 351/14
1,774,832 9/1930 Keeler........................... 351/13X
2,757,574 8/1956 Thorburn...................... 351/6X
3,067,648 12/1962 Cohen........................... 350/145X OTHER REFERENCES
Amer. J. Ophthalmology, Vol. 61, #4, page 16, April 1966 (351–6) Advertisement Keeler Optical Products, Inc.
Amer. J. Ophthalmology, Vol. 45, #1, page XXIV, Jan. 1958 (350–146) Advertisement American Optical Co.

Primary Examiner—David Schonberg
Assistant Examiner—Paul A. Sacherpas
Attorney—James T. Martin, Esq.

ABSTRACT: This invention relates to the combination of two economically simplified systems adjustably supported together for coarse and fine adjustments on a headband worn by an examiner, such as a physician wherein the first system is an optical light concentrator system including a head-mounted housing with an adjustable light source and aligned condenser lens means longitudinally adjustable therein, said system including a light reflector exterior of the housing below said condenser lens means, which exterior reflector may be angularly adjustable by the examiner by remote control means to suitably reflect the condensed light rays of the light source to an objective spot on the target area of a subject to be examined, such as the retina of the eye of the subject, and the second system of the combination consists of an observing optical system for the examiner including binoculars with a pair of occular means adjustable to suitable optical position for the examiner's vision to cooperate with an arrangement of reflector members in the binocular housing, whereby the retinal area of the eye or the like of the subject being observed is made luminously visible to the examiner with the binoculars of the observing optical system and wherein said light reflector of the optical light concentrator system may be remotely adjustable by the examiner as the subject is observed to provide for directional positioning of the light spot while the combined systems are supported together on the examiner's head.

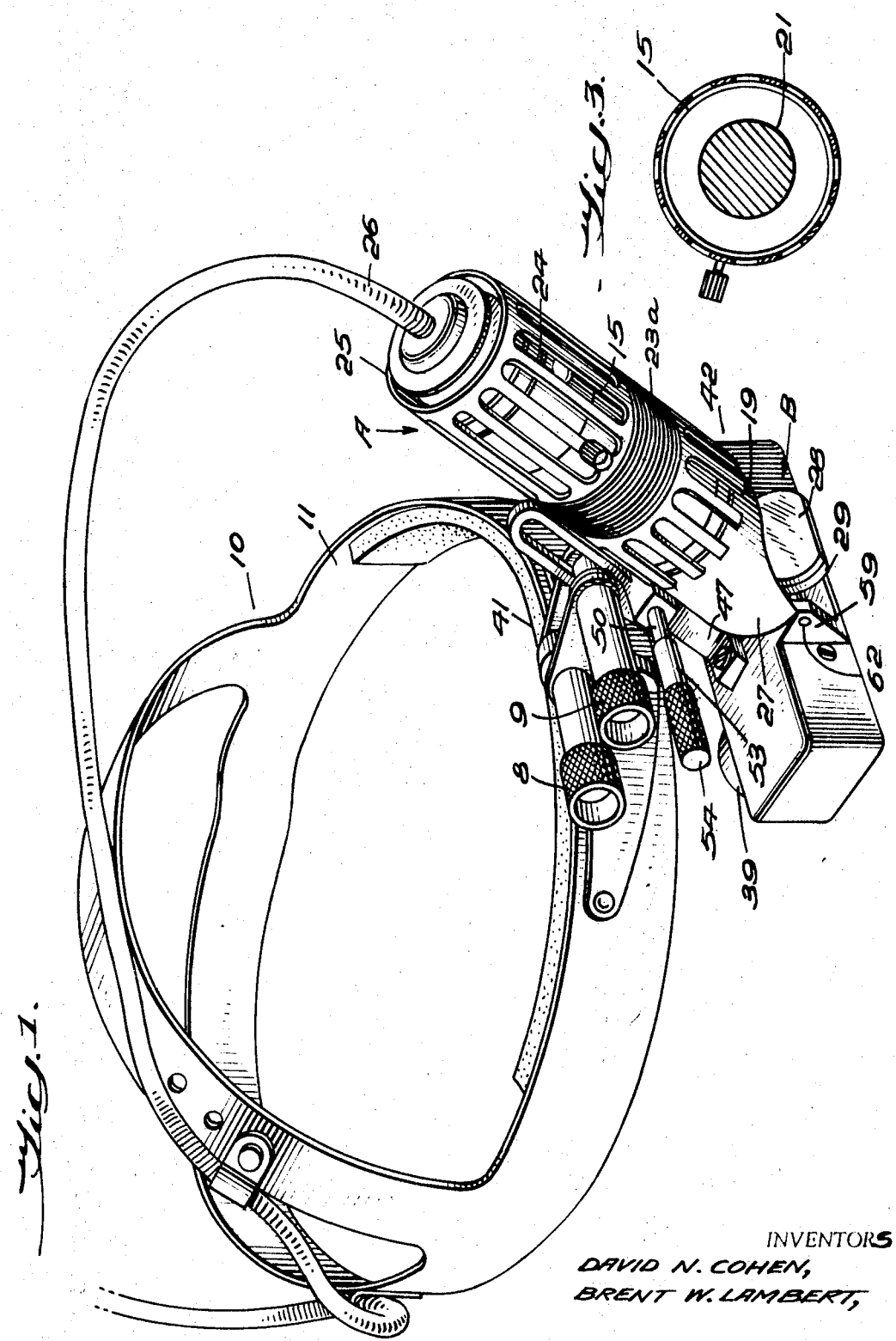

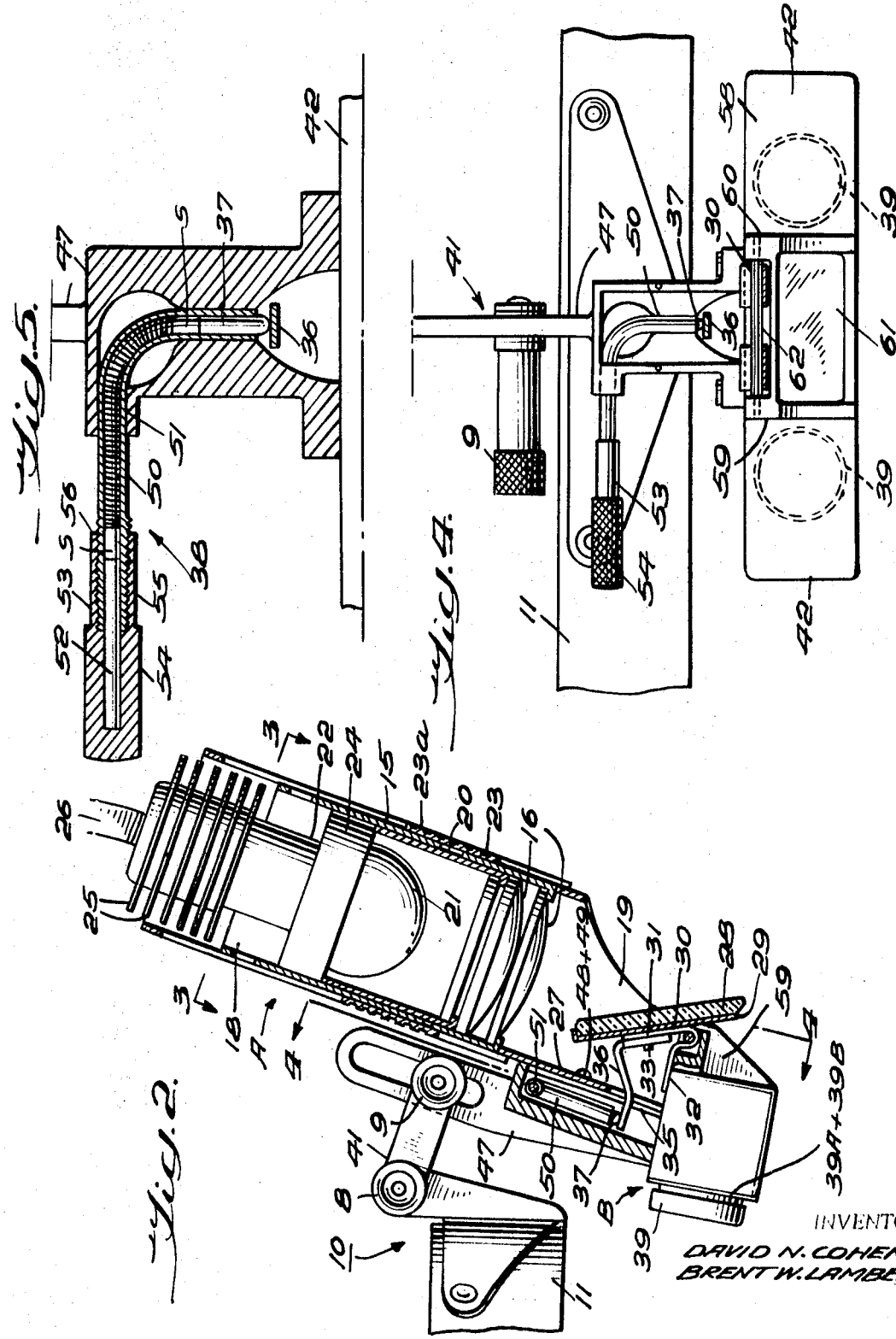

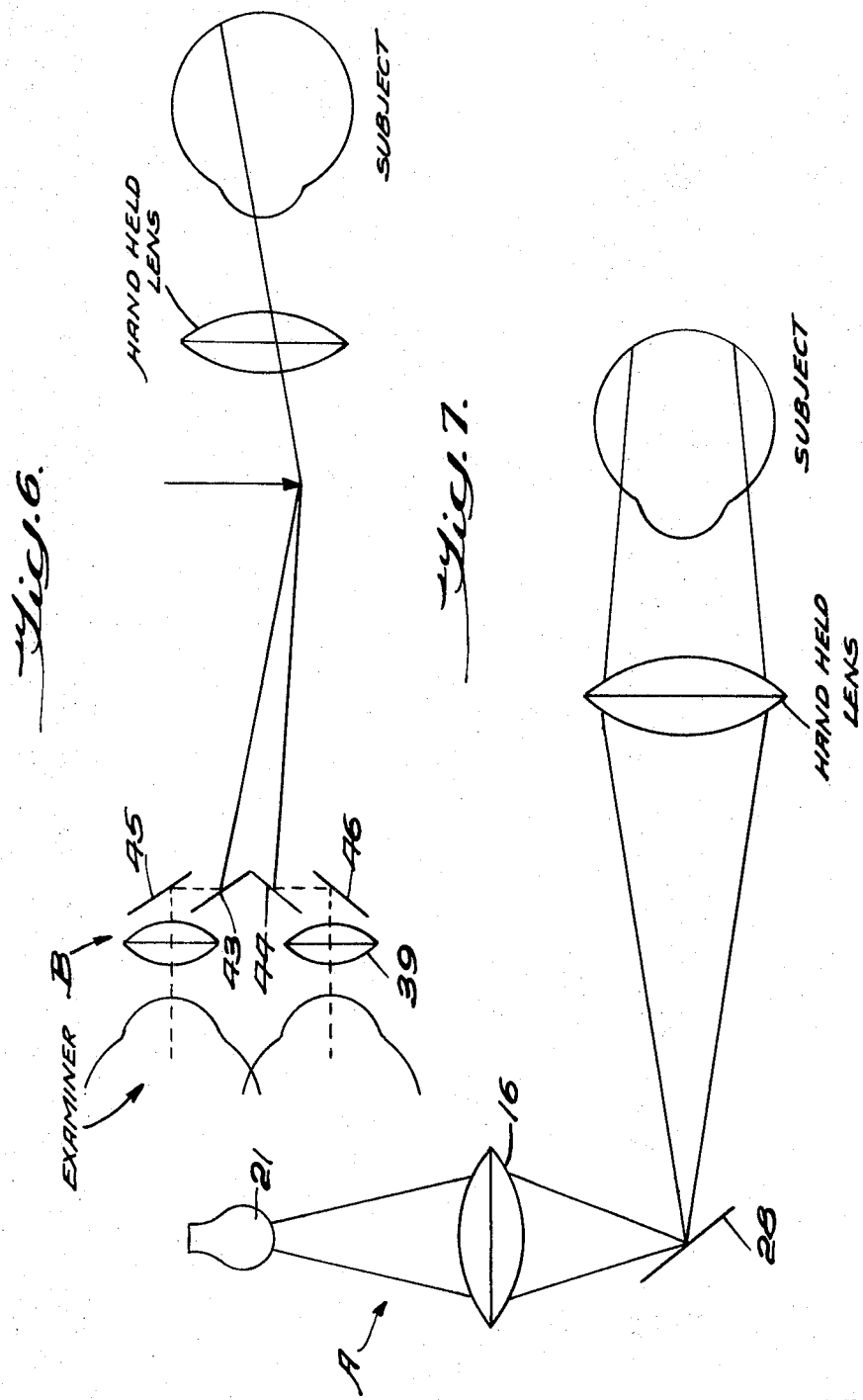

THREE-DIMENSIONAL INDIRECT OPHTHALMOSCOPE

The present invention relates generally to optical surgical instruments and, more particularly, to head-supported optical systems used together by physicians to examine the retina of the eye of a subject.

Instruments of this general class have been more cumbersome and less efficient in use, because such prior instruments have either been single head-mounted light concentrator optical systems uncoordinated with an examining physician's optical binocular system, such as the De Zeng U.S. Pat. No. 963,036, issued July 5, 1910, or when the attempt was later made to provide combined systems of optical light concentration with a projection of the condensed light rays in a spot of light to a target area on a patient or subject, the second system comprising the magnifying optical binocular means was also uncoordinated, as in Thorburn U.S. Pat. No. 2,757,574, issued Aug. 7, 1956.

For example, such prior systems were cumbersome and unsatisfactory as the examiner or physician having the respective systems mounted on a headgear was unable to adjust the reflector means to selectively position the concentrated light rays in a collimated spot of light on the target area of the subject being examined, except by handling the reflector and moving it by hand for such light spot positioning. This was unsatisfactory because the hand of the examiner would soil and deface the reflector surface to provide undesired aberrations and cause error in diagnosing an area being examined. Also, when mounted on the examiner's head not only does his hand get in the way of the light rays to be reflected, but also it is clumsy to make such manual adjustments while the examiner is viewing the subject's target area, such as the retina of the eye.

Accordingly, it is an object of this invention to provide a novel remote control adjusting means for a novelly mounted concentrated light ray reflector system, whereby the optical binocular system adjacent the ray reflector, while being used to observe the subject received light spot area, may be remotely angularly positioned without ever touching the reflector itself to position the same and project the concentrated light rays to a target point.

Another object is to provide, in combination, an optical light concentrator system and an optical binocular system mounted together and supported on headgear worn by an examining person, said concentrator system having an adjustable spring-mounted mirror for projecting a concentrated ray of light to a target spot on a subject being examined with remote manual control means to tilt the mirror to desired angular positions according to determinations of the examining person wearing the headgear, to thereby position the concentrated light rays with respect to the target spot on the subject.

Another object is to provide cooling means for dissipating heat from the light source of a light concentrator system supported by a headgear worn by an examining physician, to thereby provide for comfort and to facilitate the use of an optical binocular system likewise supported by the headgear in conjunction with said light concentrator system.

A more specific object is to provide a novel reciprocal remote control thrust means with a flexible means, such as a lubricated elongated metal coil spring, such spring may be Teflon coated, for angular adjustment of a spring-mounted projection reflector of a concentrated light beam from a headgear supported optical light concentrator system, whereby a resulting spot is positionable on the target area of a subject being examined through an adjacently mounted optical binocular means.

The foregoing and other objects and advantages of the present invention will appear more fully hereinafter from the following detailed description, when considered together with the accompanying drawings, wherein the parts in the specification are numbered and referred to by like numerals throughout the drawings.

It is to be expressly understood that the drawings, herewith, are for the purposes of illustration only and are not to be construed as defining the limits of the invention, reference being had for this purpose to the appended claims.

In the drawings:

FIG. 1 is an assembled perspective view of the present invention illustrating one embodiment of the binocular indirect ophthalmoscope;

FIG. 2 is a longitudinal cross section view of the invention with a part of the headgear broken away;

FIG. 3 is a transverse section taken along the line 3-3 of FIG. 2;

FIG. 4 is a view partly in section taken on line 4-4 of FIG. 2 showing the centrally located window in the front wall of the binocular casing;

FIG. 5 is a cross section view of the remote control means and the mountings therefor with the fine adjustment spur lug on the mirror or reflector to direct the concentrated light rays to the subject being examined through the optical binocular system;

FIG. 6 is a general diagrammatic view of the optical viewing binocular system or imaging system for viewing the point of light projected to the subject's eye being examined and illustrating use of a hand-held lens to be held by the examining party before the subject, if desired;

FIG. 7 is a diagrammatic view of the illumination system used with the imaging system showing the concentrated light rays to the patient or subject and showing a hand-held lens before the patient or subject's eye, as desired during examination.

Referring to the drawings, and first with particular reference to FIG. 1, there is shown an assembled perspective view of the respective components of the present invention; namely a headgear 10 with an annular headband 11 to which are universally mounted the two cooperatively connected systems A and B of the invention for respective coarse and fine adjustments during use. Knurled heads 8 and 9 are provided to set and adjust the universal connection on band 11.

The system A comprises an optical light concentrator system formed of an elongated tubular housing 15, with condensing lens means 16 mounted therein, so as to be axially adjustable longitudinally of the housing, see FIGS. 2 and 3. The housing 15 is open at each respective end 18 and 19 with the end 18 formed to receive a light source such as a light bulb 21 and electric power socket 22 for holding the bulb in position for directing light rays axially through the condensing lens means 16 in the housing 15 mounted in adjustable sleeve 20 to a suitable light projection means at the opposite end of the housing.

The electric power socket 22 is preferably formed with an exterior annular surface 24 adapted to frictionally engage with the interior bore of the housing 15 and may include annular heat-dissipating fins 25 around the upper bulb holder from which an electric connector cord 26 leads for connection to a suitable source of electric power. Thus, the bulb holder comprising the bulb and socket are frictionally adjustable in the upper part of housing 15 with respect to the lower medially positioned condenser lens means 16 mounted in sleeve 20 therein. Also, an exterior skeleton jacket 23 with heat-dissipating ribs 23a is spaced around part of the housing 15 and is held in place by fastening means, such as a thumbscrew or the like.

The housing end 19 below the condenser lens means is formed with an angular opening in the provision of the formation of a scoop-shaped end 27. The scoop-shaped end 27 is formed to receive a reflector such as a mirror 28 and this mirror is mounted in a support plate 29 to which is fastened a flat spring hinge 30 formed of two leaf portions 31 and 32, one leaf portion being secured by screw means 33 to the mirror support plate 29 and the other leaf portion is engaged with the roof of the binocular casing after it is folded around the hinge pin mounted between brackets 59 and 60 formed from the front wall 58 of the binocular housing 42, see FIGS. 1, 2 and 4.

The mirror support plate 29 has an elongated spur lug 36 formed therefrom which extends like a spur through a vertical slot 35 in the scoop end 27 of the housing 15, see FIGS. 1 and 2. This spur lug 36 is biased by the spring hinge 30 into engagement with the thrust pin 37 of a remote control means 38 for fine adjustments of the light rays projector mirror 28 said control means being remotely operable by an examiner, such as a physician or nurse. This remote control means is hereinafter described in connection with the optical observing or viewing system B.

The optical observing or viewing system B comprises a pair of binoculars with spaced lateral adjustable occular means 39 mounted in plates 39A and 39B slidable to position with respect to the eyes of the examiner. The binocular housing generally referenced by numeral 42 is shaped and formed interiorly so as to position and mount a stereoscopic optical mirror system comprised of mirrors 43, 44, 45 and 46, see FIG. 6, whereby when viewing an objective or target spot on an area such as the retina of a subejct's eye, the same will appear magnified with a three-dimensional effect.

The binocular housing 42 is supported by the band 11 of the headgear 10 by a universal joint 41 and a bracket 47, see FIG. 2; and, because of the universal mounting. Further, due to the fact that the elongated lamp housing 15 is secured by threaded fasteners, such as bolts 48 and 49 to the front of the bracket 47 on each side of the vertical slot 35 of housing 20, which mates or straddles the spur lug 36, the units of each respective system are thus secured together to permit manual movement of the binoculars 42 on the headband universal mounting also to permit movement of the lamp housing 15 for a coarse adjustment of the respective systems at the start of the eye examination of a subject. For example, see the diagrammatic views in FIGS. 6 and 7 showing field lens means in the provision of an indirect ophthalmoscope.

After the starting coarse adjustment of the two optical systems A and B, during the examination of a subject's eye, it usually is necessary to make fine adjustments of the projected concentrate or focus of light rays and the resulting light spot, so as to position the projected concentrated point of light in a spot on the retina in relatively fine elevational increments. This is accomplished by the novel remote control means 38, hereinbefore referred to, engaged at one end with the spur lug 36 extending from the mirror support by the thrust pin 37 of the control means.

The remote control means 38 comprises a suitably curved guide tube 50 which may be formed of metal or Teflon because of the natural lubricant effects of the latter material and which is mounted at the lower scoop-shaped end 27 of the lamp housing 15. The bore of the tube 50 encloses a reciprocatable elongated flexible means, such as a Teflon-coated coil spring or a metal spring 51 coated with suitable lubricant. This spring 51 is of a length short of the open ends of the guide tube 50 and each respective end of the spring may be in abutting contact with an enclosed end of each of the respective thrust pins 37 and 52. Or, in some instances, such opposed ends of the spring 51 and the respective aligned ends of the thrust pins may include Teflon spacer means S for promoting operating efficiency, see FIG. 5. Thrust pin 37 has an end projecting beyond the end of the tube 50 adjacent the spur lug 36 in engagement therewith and thrust pin 52 has an end projecting beyond the opposite end of the suitably curved tube 50 in engagement with the bore of a socket nut 53 with a knurled adjustment head 54 and an outer threaded bore portion 55 in a suitable mating threaded shank 56 on the tube 50, see FIG. 4.

When the knurled head 54 is turned the thrust pin 52 is moved and imparts reciprocation to the flexible means, such as the coated spring or the like 51, in the guide tube 50 and thence to move the thrust pin 37 in contact with the spur lug 36 carried by mirror 28. This causes the reflector to pivot on the leaf spring hinge 30 supporting the reflector or mirror 28, to thereby provide for fine angular adjustments to position the reflected concentrated light beams in a spot of light at desired elevational positions over an area being examined during the examination of the subject.

The binocular casing 42 includes a front wall 58 with an opening defined by hinge pin brackets 59 and 60 and with a window 61 centrally located therein and recessed inwardly of the brackets. Also, centrally of the window is positioned the apex point of diverging mirrors 43 and 44 positioned to equally reflect from the reflecting surfaces of mirrors 45 and 46 to their respective occular members 39. The brackets 59 and 60 are formed with sockets to receive the opposed free ends of a hinge pin 62 around which the spring hinge 30 is medially folded, see FIG. 6.

Thus, there is provided a novel three-dimensional binocular indirect ophthalmoscope combination, wherein the casing of the optical binocular is arranged with mounting means for all the components of the light concentrator system.

Without further description it is believed that the novel combination of elements of the present invention has been sufficiently described and illustrated, to permit a clear understanding thereof as required under the patent statutes.

What we claim is:

1. In an indirect ophthalmoscope of the type that includes an optical system comprising a support means, a light source, a mirror, said light source mounted on said support means, said mirror attached to a flexible means mounted on said support means and positioned to receive and reflect light emanating from said light source, the combination thereof with remote control thrust means operatively adjacent to said flexible means and mounted on said support means in a manner to provide for selective adjustment of said mirror by action of said thrust means on said flexible means to vary the angle of reflection of light emanating from said light source and reflected by said mirror.

2. In an indirect ophthalmoscope of the type that includes an optical system as described in claim 1, a thrust means that includes a tubular thrust guide, thrust pins, a thrust spring and a manually adjustable thrust means initiator, said thrust pins located at either end of said tubular thrust guide and separated by said thrust spring, said manually adjustable thrust means initiator mounted adjacent one of such pins so that, by manual adjustment, that initiator means urges one thrust pin against said thrust spring that in turn is urged against the other thrust pin that in turn urges against the flexible means attached to said mirror.

3. In an indirect ophthalmoscope of the type that includes an optical system as described in claim 2, a thrust spring that is made of a material having a relatively low coefficient of friction.

4. In an indirect ophthalmoscope of the type that includes an optical system as described in claim 2, a tubular thrust guide whose axis is curved.

5. In an indirect ophthalmoscope of the type that includes an optical system as described in claim 1, a flexible means mounted on said support means and attached to said mirror that comprises a spring means.

6. In an indirect ophthalmoscope of the type that includes an optical system as described in claim 2, a flexible means mounted on said support means and attached to said mirror that comprises a spring means.